(12) United States Patent
Montemer (10) Patent No.: US 7,596,218 B2
(45) Date of Patent: Sep. 29, 2009

(54) ENHANCED DIRECTORY ASSISTANCE SERVICES IN A TELECOMMUNICATIONS NETWORK

(75) Inventor: William A Montemer, Long Beach, CA (US)

(73) Assignee: Local.Com Corporation, Irvine, CA (US)

( * ) Notice: Subject to any disclaimer, the term of this patent is extended or adjusted under 35 U.S.C. 154(b) by 949 days.

(21) Appl. No.: 10/448,808

(22) Filed: May 30, 2003

(65) Prior Publication Data

US 2003/0223565 A1 Dec. 4, 2003

Related U.S. Application Data

(60) Provisional application No. 60/384,955, filed on Jun. 3, 2002.

(51) Int. Cl.
H04M 3/42 (2006.01)
(52) U.S. Cl. ............... 379/218.01; 379/218.02
(58) Field of Classification Search ................. 379/218.01–218.02
See application file for complete search history.

(56) References Cited

U.S. PATENT DOCUMENTS

| | | | |
|---|---|---|---|
| 6,269,361 B1 | 7/2001 | Davis et al. | |
| 6,301,583 B1 * | 10/2001 | Zellweger | 707/103 R |
| 6,519,616 B1 | 2/2003 | Zamora-McKelvy et al. | |
| 7,409,048 B2 * | 8/2008 | Trandal et al. | 379/88.19 |
| 2002/0147639 A1 * | 10/2002 | Williams et al. | 705/14 |
| 2002/0166127 A1 * | 11/2002 | Hamano et al. | 725/105 |
| 2003/0037028 A1 * | 2/2003 | Akhteruzzaman et al. | 707/1 |
| 2003/0225682 A1 | 12/2003 | Montemer | |
| 2004/0006511 A1 | 1/2004 | Montemer | |
| 2004/0010518 A1 | 1/2004 | Montemer | |
| 2004/0023644 A1 | 2/2004 | Montemer | |
| 2005/0053220 A1 * | 3/2005 | Helbling et al. | 379/211.02 |

\* cited by examiner

*Primary Examiner*—Rasha S Al Aubaidi
(74) *Attorney, Agent, or Firm*—Van Pelt, Yi & James LLP (57) ABSTRACT

Directory assistance provides telephone number look up services to callers based on the business or caller name as listed in a telephone directory. As such, directory assistance in the prior art provides a value-added service to telephone users and an expense that must be charged back to telephone subscribers or absorbed by telephone carriers. The present invention provides a method and system whereby directory assistance is enhanced to deliver a targeted advertising service to telephone listing owners and advertisers. The enhanced directory assistance (EDA) service of the present invention becomes an additional revenue source for carriers. The present invention also provides a method and system for dynamically ordering these directory listings and tracking subsequent telephone referrals.

17 Claims, 10 Drawing Sheets

FIG. 4 Enhanced Directory Assistance Listing Management Server

ENHANCED DIRECTORY ASSISTANCE SERVICES IN A TELECOMMUNICATIONS NETWORK

RELATED APPLICATION INFORMATION

This application claims priority from U.S. Provisional Patent Application No. 60/384,955 filed Jun. 3, 2002 and which is incorporated herein by reference.

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by any one of the patent disclosure as it appears in the Patent and Trademark Office patent files or records, but otherwise reserves all copyright and trade dress rights whatsoever.

BACKGROUND OF THE INVENTION

1. Field of the Invention

The present invention relates to the field of telecommunications, and particularly to providing advertising opportunities in directory assistance systems.

2. Description of Related Art

Telephone Directory Assistance has been around as long as there have been telephone operators. Once the number of telephone subscribers reached two and three digits, telephone directories were published as service to the large numbers of telephone subscribers. These published telephone directories or books helped both the subscribers and telephone operators locate and contact other telephone subscribers.

There are two types of telephone directories. The White Page-styled directory lists basic telephone contact information for all telephone subscribers; basic listings are free to all subscribers and subscribers are listed by name. The Yellow Page-styled directory lists products and services by category, to be included in a Yellow Page directory an advertiser must pay a fee. The Yellow Page directory advertiser pays for both the size of the advertisement or listing and for its inclusion in one or more specific categories.

Traditional directory assistance service provides telephone number look up to the White Page style directory. Enhanced directory assistance service provides look up to a Yellow Page style directory. The difference between the two is based on how a caller finds a particular directory listing.

In a traditional directory assistance service, the caller contacts a directory assistance operator and gives the operator the name of a business or person and its associated locale. The directory assistance operator then searches a telephone directory database for a telephone listing that matches the sought-after criteria. Upon finding a match or a set of matches, the operator informs the caller and either gets further information to narrow the results or offers to connect the caller to a desired telephone number.

In an enhanced directory assistance system, a caller contacts a directory assistance operator and in addition to providing as some localization information to narrow where the caller wishes to find the product or services, the caller provides a category name or keyword associated with the desired product or service. In the present art, an enhanced directory assistance operator then takes the provided information and searches or queries a Yellow Page-styled directory. Upon finding a match, the operator informs the caller and either gets further information to narrow the results or offers to connect the caller to the desired telephone number.

In the present art, inclusion in these paid listings is offered to a business or organization through monthly or yearly subscription fees. Also in the present art, listing partners can pay a premium fee to be listed at the top of a category or keyword lookup result list. The premium or preferred listing is given priority treatment by the directory assistance operator and mentioned before any other paid listings are communicated.

Several problems are presented by the current art in respect to making telephone number look up a profitable business venture.

In systems that use keywords to classify products and services, the keywords are determined independently from the business owners themselves. For instance, many directory assistance systems derive their keywords and classification from the government supplied Standard Industrial Code (SIC) system or something similar. This type of classification system, while being widely adopted, is also slow to change and adapt. Also, due to this inertia, the system does not offer enough granularity, meaning that a wide variety of products that are very different may fall under a single classification. For instance electronic farm monitoring equipment might fall under same electronics category as portable music devices.

In the current art the order of the listings is determined by uncontrollable methods. For instance, if result listings are arranged alphabetically, the only way to insure that your listing is included at the top of a list—with the exception of the paying for premium higher cost listings—is to change the name of the product or service.

DETAILED DESCRIPTION OF THE INVENTION

Throughout this description, the embodiments and examples shown should be considered as exemplars, rather than limitations on the apparatus and methods of the present invention.

Enhanced Directory Assistance (EDA) services provide opportunities for telephone listing owners and advertisers to promote their products and services to telephone callers looking for the same products and services. The EDA system disclosed here provides a method and system whereby directory assistance is enhanced to deliver a targeted advertising service to telephone listing owners and advertisers.

Figure 1:
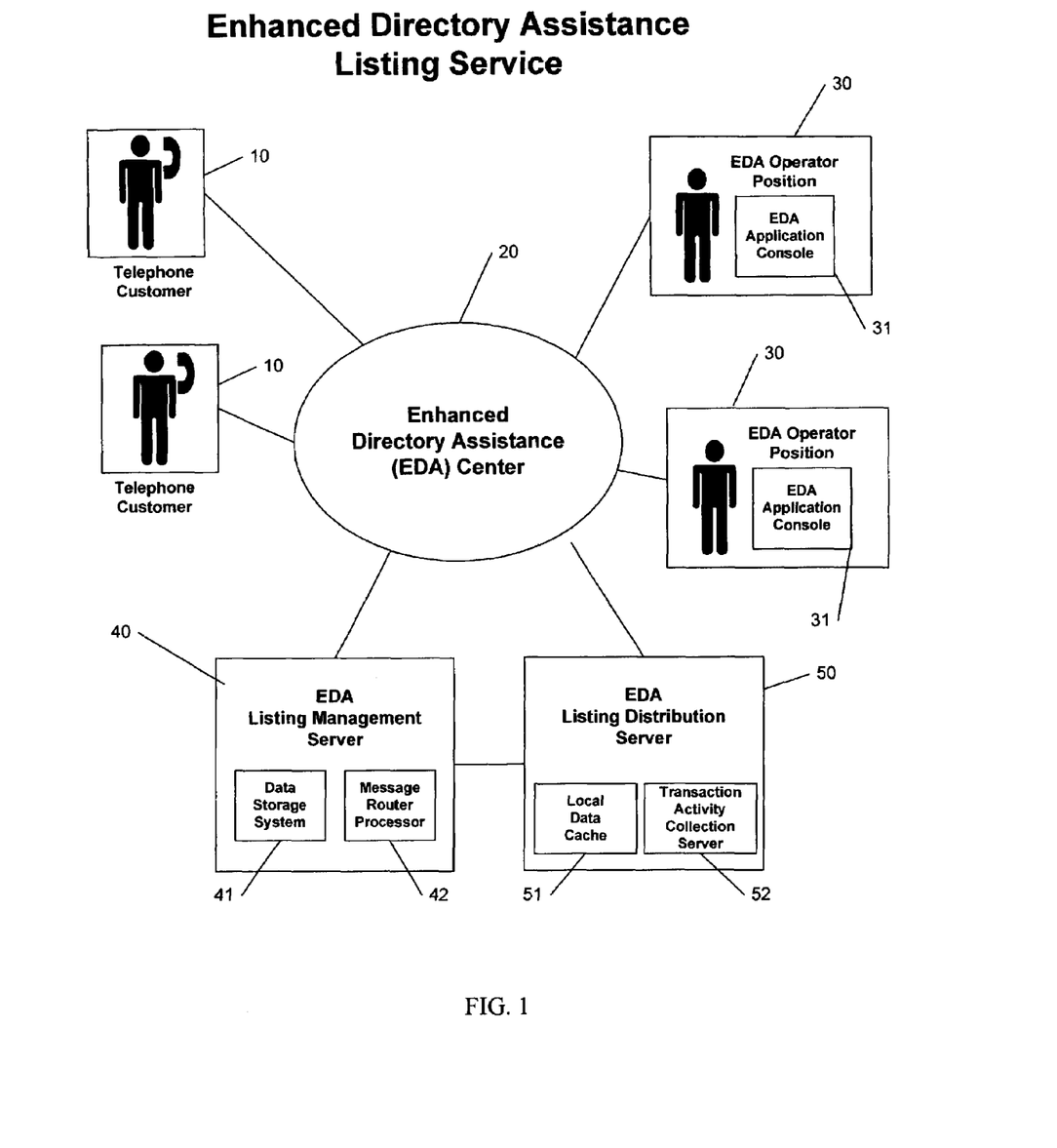
FIG. 1 is a system block diagram of an Enhanced Directory Assistance System utilizing human operators.

In reference to FIG. 1, the illustration shows a preferred implementation of a basic EDA service implementation. A telephone customer 10 connects to an EDA Center 20. An EDA operator position 30 at the EDA Center processes the call with an EDA application console 31. The EDA application console connects to an Enhanced Directory Assistance Listing Management Server (LMSvr) 40 that contains a telephone listing Data Storage System 41 and a telephone directory listing Query Processor 42.

The EDA operator requests listing data from the LMSvr. The LMSvr receives the request and dispatches results to the EDA Listing Distribution Server (LDSvr) 50. The LMSvr connects to an LDSvr that contains a Local Data Cache 51 and a Transaction Activity Collection server 52. The LDSvr caches or holds the results of a query. The results represent a set of telephone referral numbers that can be relayed to the telephone customer.

If the telephone customer accepts a referral, that acceptance event is recorded or captured and used for further business processing. The business processing may involve charge backs to listing owners or advertisers, or storage of the query, results, and acceptance event for later demographic analysis.

Figure 1A:
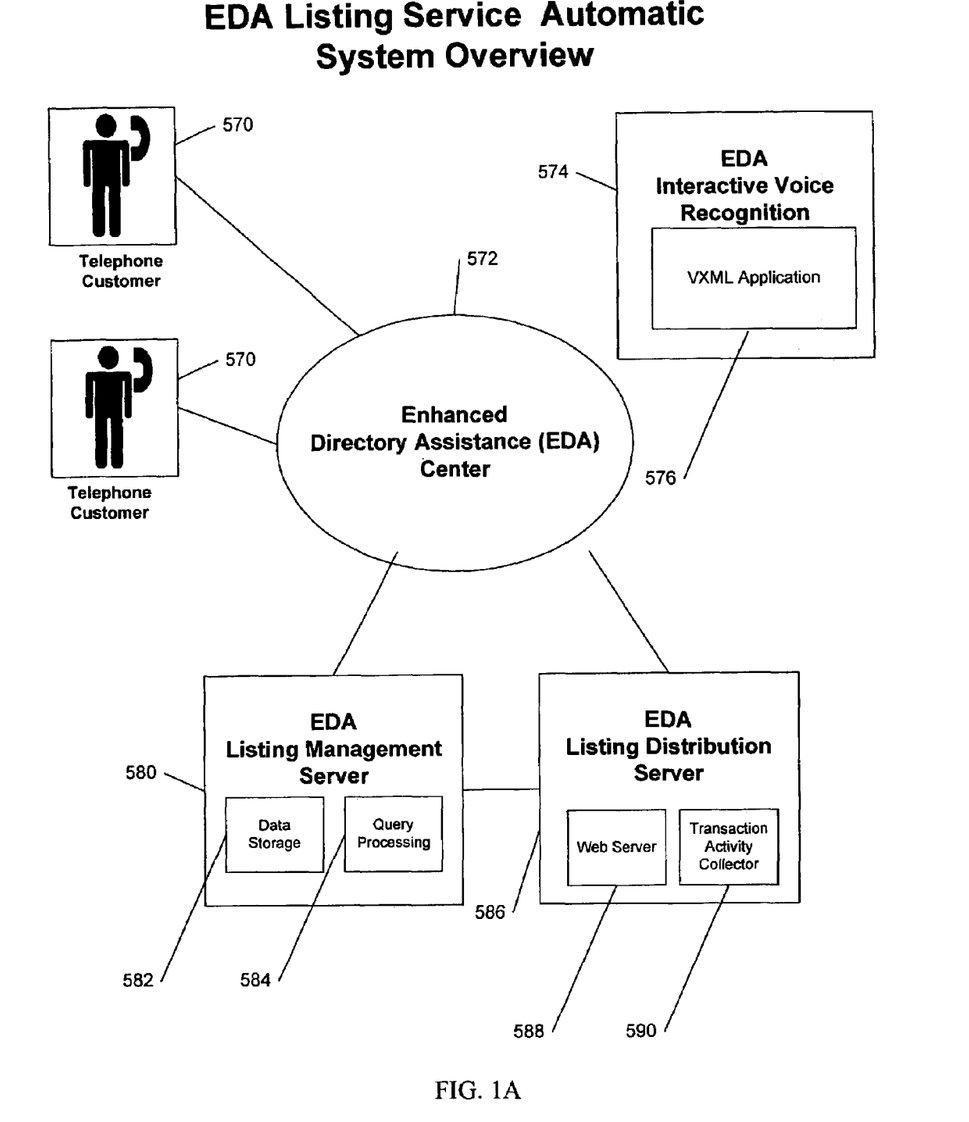
FIG. 1A is a system block diagram of an automated Enhanced Directory Assistance System.

In reference to FIG. 1A, the illustration shows a preferred implementation of an automated EDA service implementation. A telephone customer 500 connects to an EDA Center 510. An EDA Interactive Voice Recognition (IVR) application 520 at the EDA Center processes the call. The IVR app is a Voice XML (VXML) application that recognizes and translates vocal utterances into computer requests. The EDA IVR application connects to a LMSvr) 526 that contains a telephone listing Data Storage System 527 and a telephone directory listing Query Processor 528. The LMSvr connects to an EDA LDSvr 530 that operates as described previously.

In a preferred implementation, the functions of the LMSvr and the LDSvr are combined in a single system.

In a preferred implementation, the single system is a SQL database and a collection of standard ANSI SQL procedures and SQL commands.

EDA Operational Flow

Figure 2:
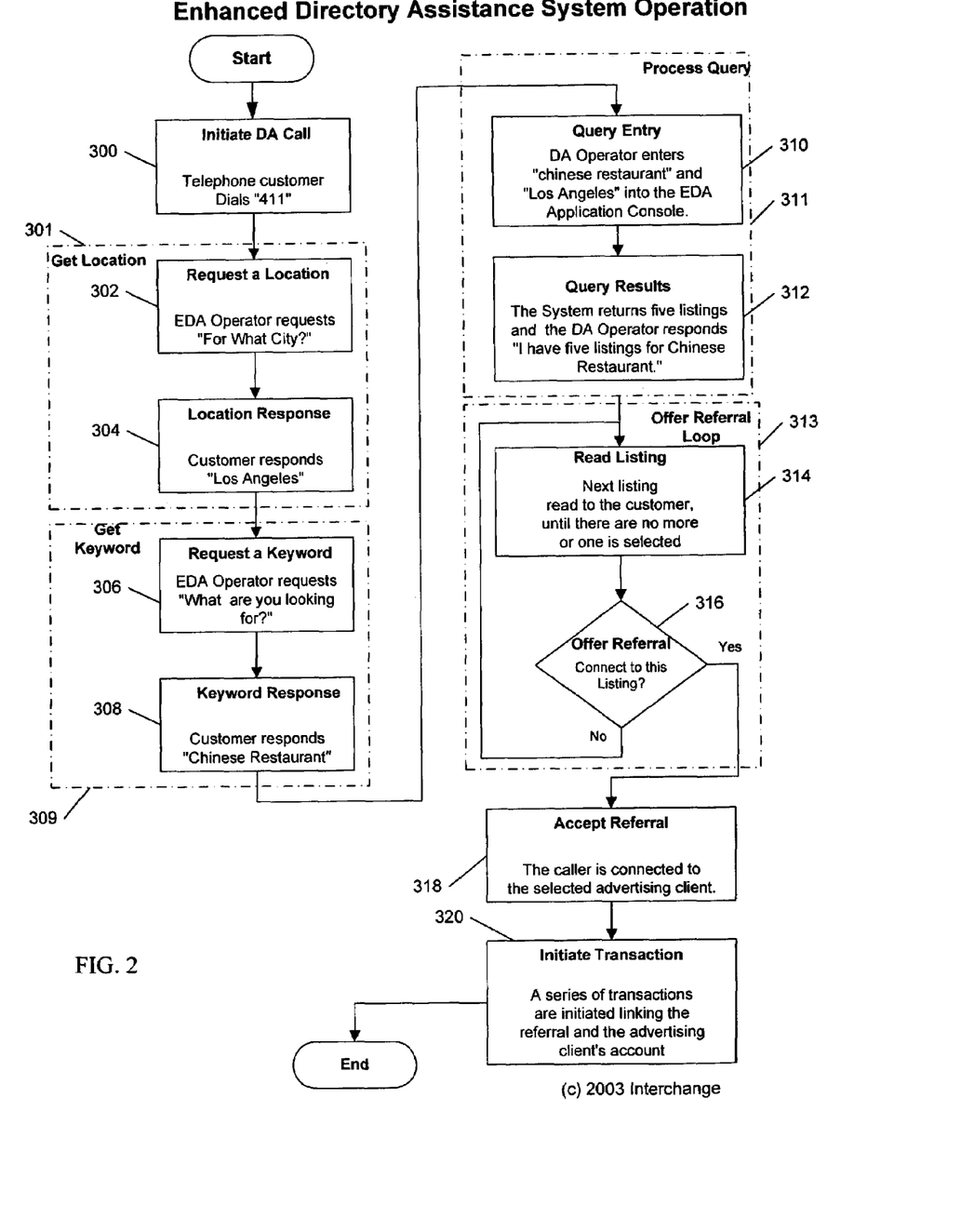
FIG. 2 is a flow chart of the Enhanced Directory Assistance System operation as seen from a caller's point of view.
Figure 2A:
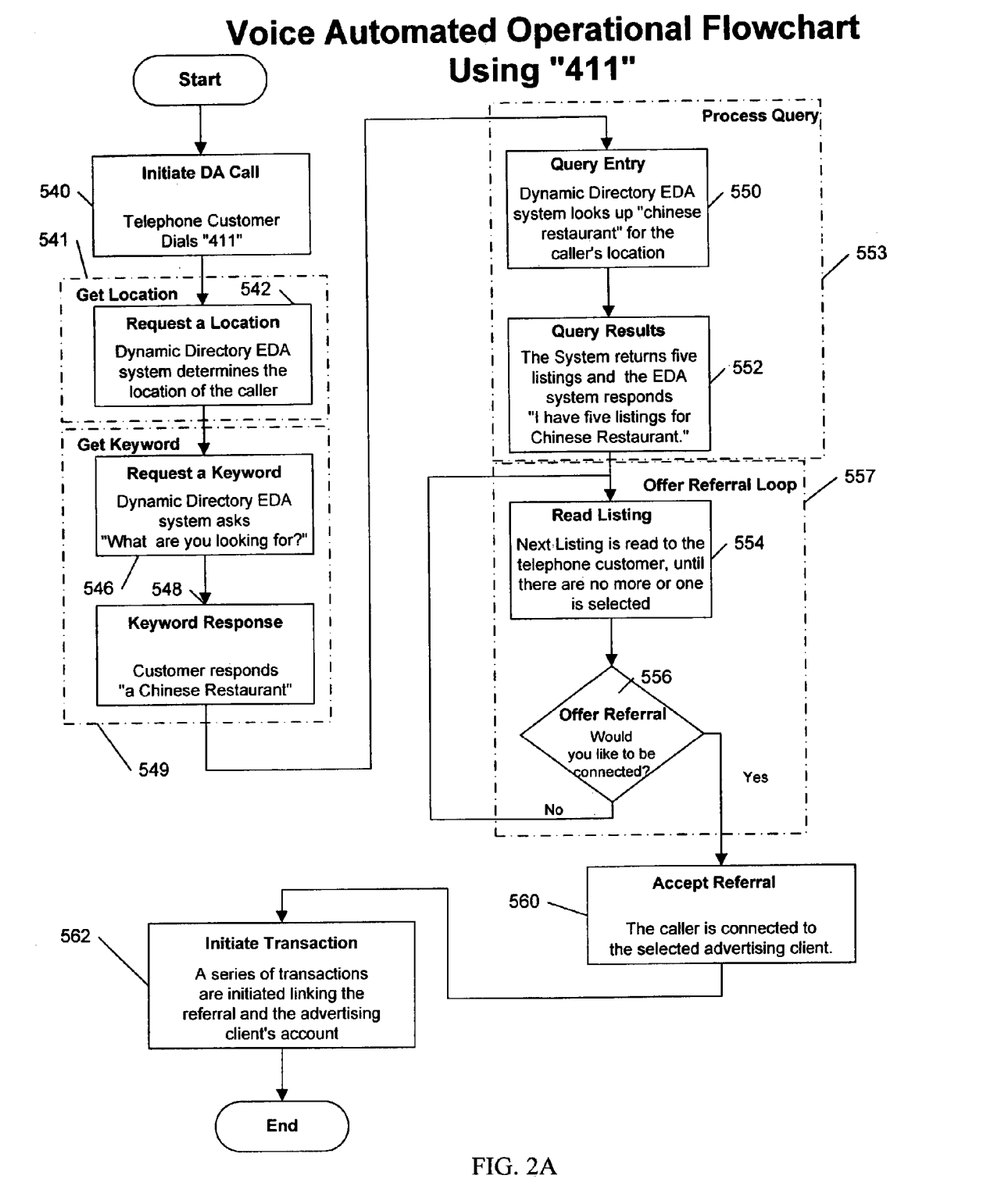
FIG. 2A is flow chart of the automated Enhanced Directory Assistance System operation as seen from a caller's point of view.

Referring to FIG. 2 unless otherwise indicated, the telephone customer shown in FIG. 1-10 Initiates a DA Call 300 by dialing a predetermined number such as "411". The telephone customer connects with the EDA Center FIG. 1-20 that assigns the call to an Enhanced DA Operator (EDA Op) position FIG. 1-30. The EDA Op picks up the inquiry and executes the Get Location 301 process. The EDA Op Requests a Location 302 from the caller by asking "For What City?" The telephone customer responds with a Location Response 304 such as "Los Angeles".

In another preferred embodiment, The telephone customer connects with the EDA Center by dialing a predetermined series of DTMF tones such as "*711" or "##*"

In a preferred embodiment the Get Location process is automated. Using Automatic Number Identification (ANI) that is well known in the art a computer system can detect the location of the calling party automatically. The detected code identifier can then be saved in a computer variable for later use.

Next, the EDA Op executes the Get Keyword 309 process. The EDA Op Requests a Keyword 306 from the caller that describes that product or service the caller is looking for. Keywords are words or phrases and can be the actual name of the product or service such as "Marie Callender's" or a descriptive word or phrase that is associated with the product of service such as "strawberry pie".

The caller responds with a Keyword Response 308 such as "Chinese restaurant". The EDA Op processes the DA inquiry by inputting the inquiry at Query Entry 310.

In a preferred embodiment the Get Keyword process is automated. Using technologies that are well known in the art such as Interactive Voice Recognition (IVR) and standard voice application platforms such as Voice XML (VXML), an automated dialogue obtains the desired keyword by recognizing and translating the vocal utterance into a computer recognized character string. The recognized keyword identifier can then be saved in a computer variable for later use.

EDA Operator Position Station

Figure 3:
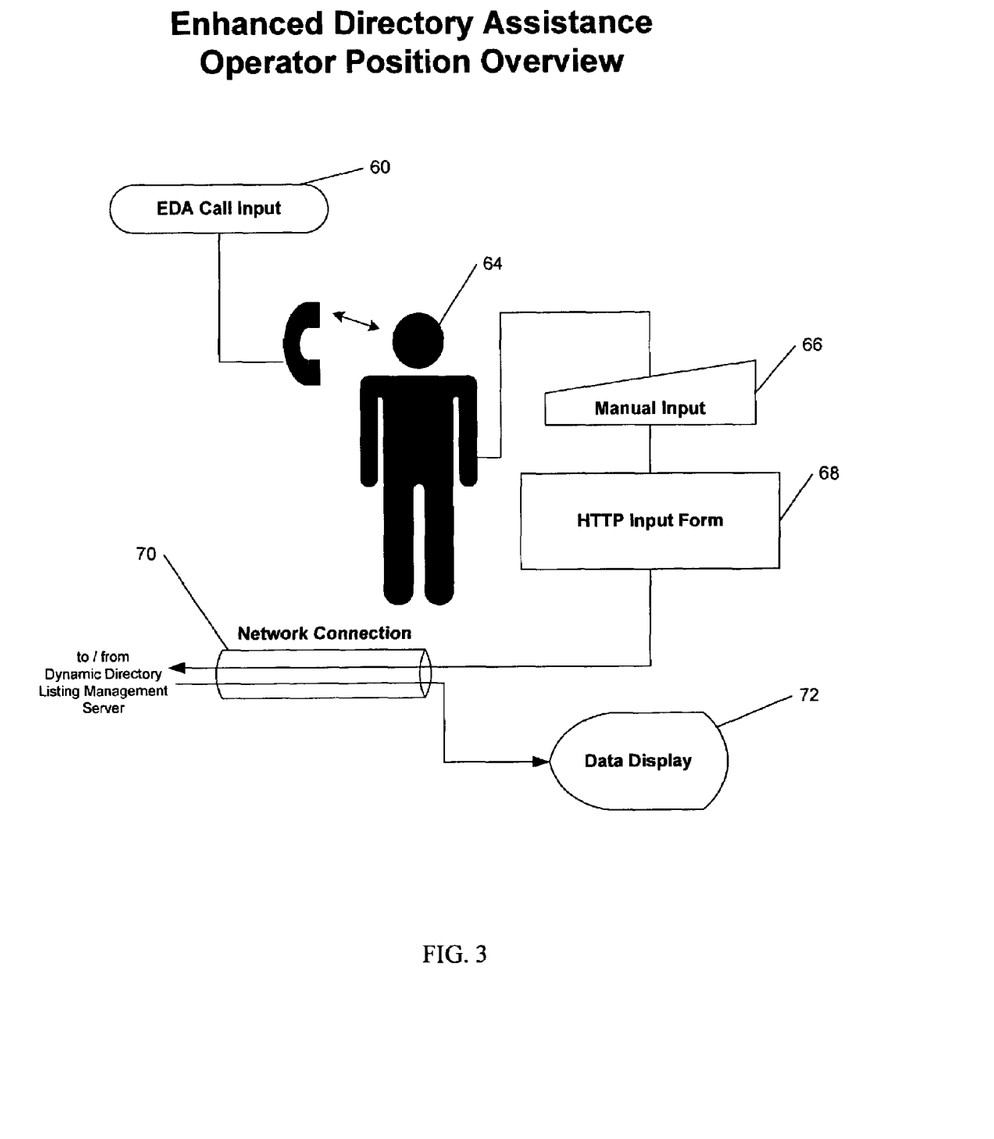
FIG. 3 is a system block diagram of an Enhanced Directory Assistance Operator Position station.

The EDA Op executes the Query Entry process through the EDA Application Console FIG. 1-31. As shown in FIG. 3, the EDA Operator Position station contains an input keyboard 66. The EDA Op 64 enters "Los Angeles" and "Chinese restaurant" on the input keyboard. The EDA application system then places data into an HTML Input Form 68 that is well known in the art.

Upon clicking on the HTTP form submit button, the EDA Application converts the input form query to a message query. In a preferred implementation, the message query is an XML document in the standard and well-known XML format. The EDA Application sends the message query through a Network Connection 70 to the LMSvr FIG. 1-40 via the EDA Center FIG. 1-20.

Figure 4:
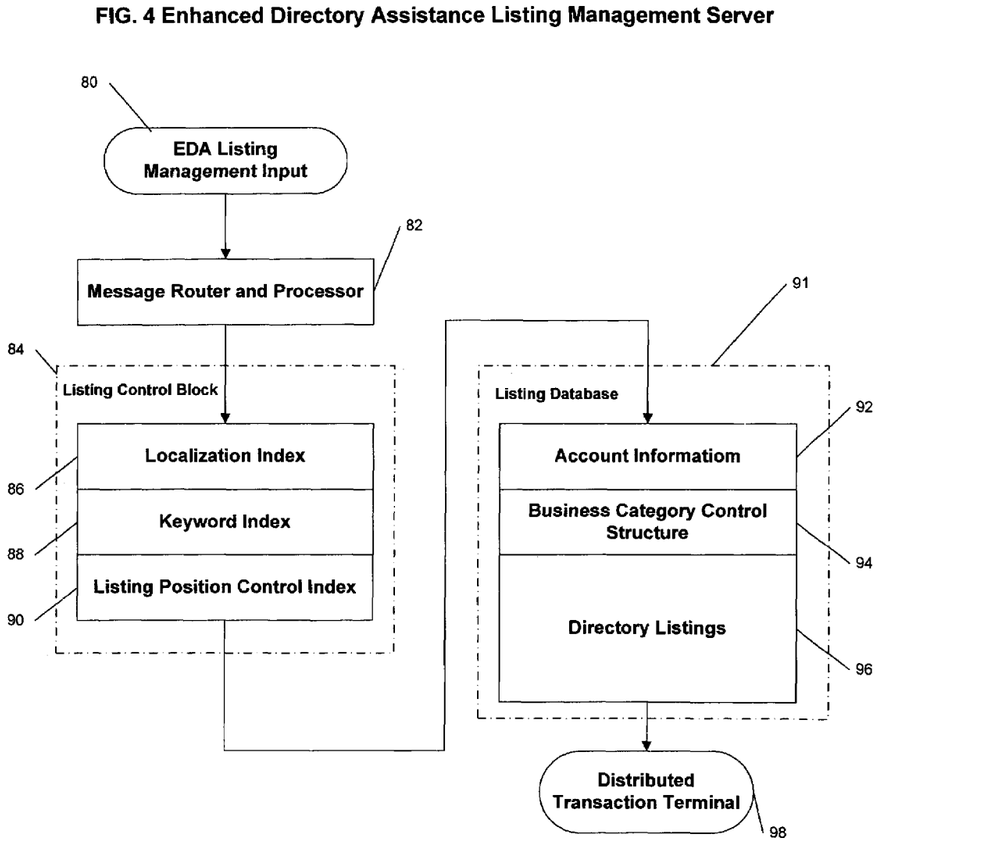
FIG. 4 is a system block diagram of the Enhanced Directory Assistance Listing Management Server.
Figure 5:
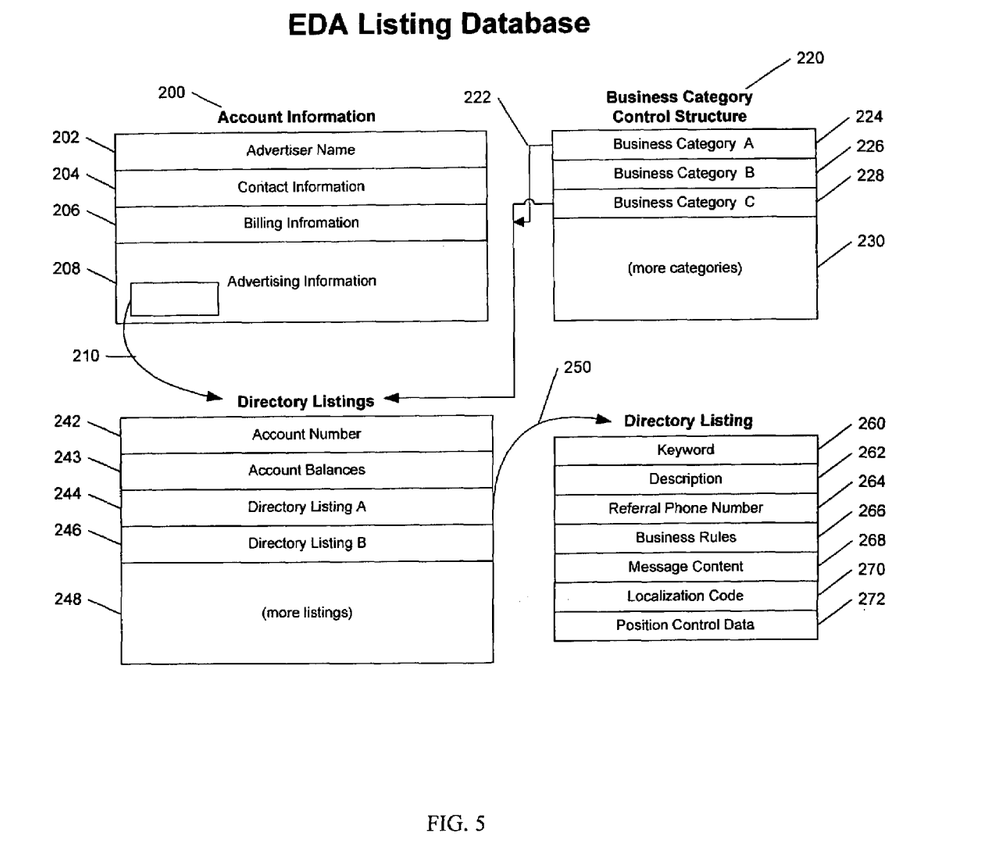
FIG. 5 is a system block diagram of the Enhanced Directory Assistance Listing Database.

The detailed operation of the LMSvr is disclosed in FIG. 4 and FIG. 5. The LMSvr processes the requested message query; any results are returned through the network connection. The LMSvr accesses a data storage system that contains business and directory listing data.

In a preferred implementation, the business and directory listing data is a database of products and services. The database contains descriptive information, business owner or advertiser information and contact phone numbers related to specific advertiser listings.

In the implementation, a message query processed by the LMSvr returns a set of listings, descriptions and phone numbers. The set is organized in a predetermined way and contains listings for a specified locale.

Keyword Processing

In a preferred implementation, the listings are organized by keywords. As is known in the art, a keyword is a descriptive word or phrase that is used to classify or identify a product or service. In a telephone directory, a product or service has a title, description and phone number and is known as a listing. In the implementation each listing is associated with one or a plurality of keywords.

In a preferred implementation, the LMSvr receives a query specifying a keyword and applies the query to a listing database server. The operation of such a database server is well known. The database server returns a set of listings related to the specified keywords.

The returned set of results are displayed on the console Data Display 72 where the EDA Op can interpret and choose to continue to the next in the process and offer to refer the caller to a listing as shown in the Offer Referral Loop FIG. 2-313 process.

In a preferred implementation, the results are displayed in HTML tables and HTML pages. In another preferred implementation, the set of results is returned as an XML document.

Referring once again to FIG. 2, the EDA Op executes a Read Listing 314 process, where listing descriptions are read to the customer one at a time in sequential order. In a preferred embodiment, the EDA Op may playback a recorded advertiser message rather than read the message aloud. In another preferred embodiment, the EDA Application may employ a text-to-speech conversion unit to convert the advertiser message to a synthesized vocal audio message.

After each listing description is read or played back, the EDA Op executes the Offer Referral 316 process by asking "Connect to this Listing?" The customer may choose one of several options: "yes"—be connected; or "no"—listen to the next listing description; or terminate the call.

If the customer accepts, the Accept Referral 318 process begins and the caller is connected to the listing owner's contact telephone number. Next the system Initiates Transactions 320 where a series of transactions linking the customer referral and the listing owner's accounts are started.

If the customer does not accept, the next listing is read or played pack (if it exists), followed by the next Offer Referral step. Next, the process continues as above.

In the implementation, the result of the offer referral process is the central point of the disclosed targeted advertising process. The results given to the customer are targeted because they are the direct result of a customer's search or inquiry.

If the customer accepts a referral, the owner of the referred listing incurs a monetary charge. The charge and all subsequent charges represent a new revenue stream for the EDA service operators.

In a preferred implementation, this revenue stream can be shared between telecommunications operators, advertising intermediates and other business partners.

In a preferred implementation, the Offer Referral Loop process is automated. Using well-known voice application technologies such as VXML, a multiple selection voice dialogue menu can execute the processes within this block.

EDA Listing Management Server

FIG. 4 shows a system block diagram of the EDA Listing Management Server implementation. An EDA query in the form of a query message is received at the EDA Listing Management Input 80 and sent to a Message Router and Processor (MRP) 82.

In a preferred implementation, the query is an XML formatted character-based message that is well known and well understood in the art. In a preferred implementation, the XML message is in the form of a Simple Object Access Protocol (SOAP) message format.

The MRP receives and processes a plurality of messages. The MRP determines what type of message is being processed, formats the message parameters appropriately and adds additional processing data if necessary. The techniques used in this message processing and message routing are well known. In a preferred implementation, the MRP implements a Web Service Routing Protocol (WS-Routing) that is currently being developed by various World Wide Web (WWW) consortiums.

In a preferred implementation, the MRP adds destination routing data to each query message and dynamically determines where the results of the query will be sent.

A Plurality of Messages

The MRP processes a plurality of messages. These messages include system generated maintenance requests; user generated lookup queries and advertiser generated refresh requests.

Simple Keyword Lookup (KLU) message queries contain a keyword parameter and a specific localization parameter and are returned to the EDA Application console. Position Control Refresh (PCR) messages contain a keyword parameter and instructions used to refresh the indexes in the Listing Control Block 84. Local Data Refresh (LDR) queries contain keywords and refresh cycle time parameters and are returned to the LDSvr. The results of LDR queries are used to update the local cached results.

The MRP connects to a Listing Control Block 84 that contains a Localization Index 86, a Keyword Index 88 and a Listing Position Control Index 90. These indexes are used to control what keyword listings are selected and the order in which they are returned. The techniques of database indexing are well understood in the current art.

In a preferred implementation, the Listing Control Block applies filters to the listing database and returns an ordered set of directory listings. In a preferred implementation, the set of returned listings is an XML document in the well-known XML format. In another preferred implementation, the set of returned listings is an extensible Hyper Text Markup Language (XHTML) format.

The Listing Control Block connects to a Listing Database 91. The Listing Database contains the actual directory listing data. The composition of telephone directory listing databases is well known in the art. Referring to FIG. 4, a preferred implementation contains an Account Information 92 block, a Business Category Control Structure 94 block and a Directory Listings 96 data storage block.

The Listing Database

The Listing Database of the preferred implementation supports all the data operations required by the EDA Center. These operations include database maintenance such as data backup and database optimization, and business management operations such as account information management. The Listing Database also supports the operation of the EDA Service. In the preferred implementation under disclosure, the database maintenance and business management operations follow standard practices according to the current art unless specifically detailed.

The database operations of the EDA Service are unique to the invention under disclosure and are detailed in FIG. 5.

FIG. 5 shows a system block diagram of the EDA Listing Database. Referring to FIG. 5, the Listing Database contains a collection of database tables that are serviced by a database engine. Database engine is technology is well understood in the current art.

The Listing Database of the preferred implementation contains an Account Information 200 table. The Account Information table contains information about EDA listing owners, business partners and Listing advertisers. The information contained in the table includes Advertiser Names 202, Contact Information 204 such as telephone numbers, and Billing Information 206.

The table also includes links to detailed Advertising Information 208. Included in the implementation is a link 210 to a set of Directory Listings.

In a preferred implementation, the table of Directory Listings is composed of a unique identifying account number 242, Account Balance entries 243, and one or a plurality of individual Directory Listings 244, 246, 248.

In a preferred implementation, each Directory Listing is linked 250 to an individual Directory Listing record. Each listing record contains:

a list of Keywords 260 associated with the listing,
a Description 262; a Referral Phone Number 264,
a Business Rule identifier 266 specifying the business process that applies of the listing,
a Listing Message 268 that is read or played back,
a set of localization codes 270 that identifies the effective locality of the listing,
position control data 272.

The position control data is used to specify a comparative ranking. This ranking is used to determine the order in which the listings are returned in the Get Listing procedure as detailed in FIG. 6.

The Get Listings Database Operation

Figure 6:
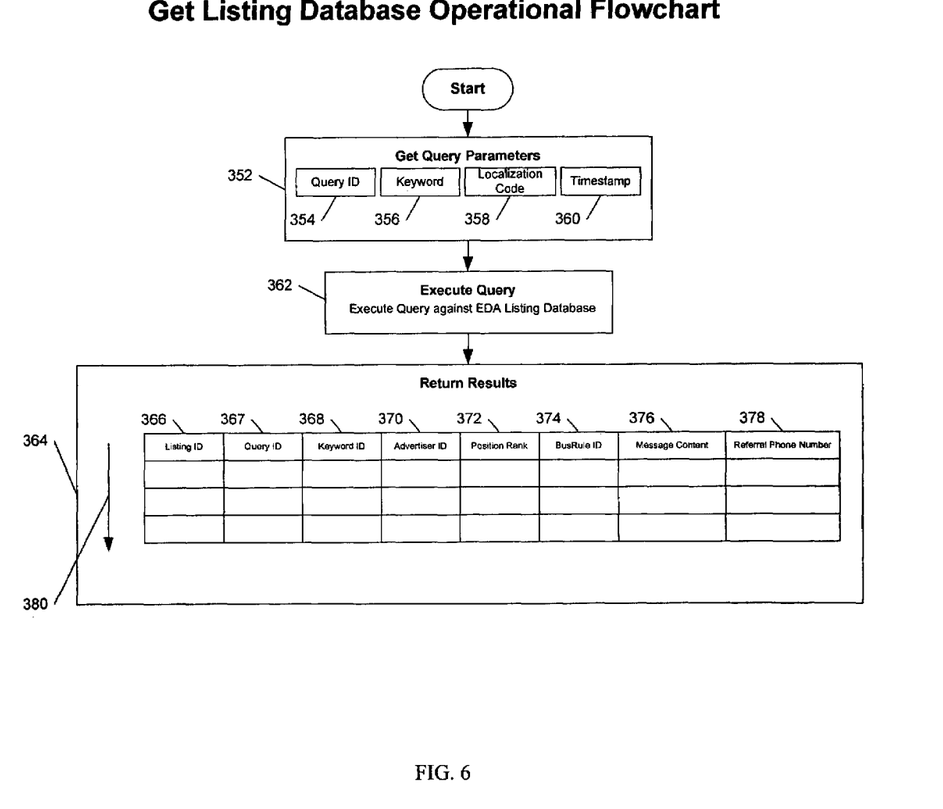
FIG. 6 is a flow chart of the Get Listing Database operation.

FIG. 6 shows an operational flowchart of the operation of the Listing Database procedures in a preferred EDA LMSvr implementation.

Referring to FIG. 6, the Get Listings process of a preferred implementation begins by executing a Get Query Parameters 352 process. The query includes a Query ID 354 parameter to identify the particular query, a Keyword 356 parameter, a Localization code 358 and a Timestamp 360 for auditing purposes. The parameters are used to construct a standard ANSI SQL database query and executed by the Listing database engine as shown in Execute Query 362. The operation of SQL database engines are well known and well understood in the art.

The Listing database engine returns results as shown in block 364 consisting of zero or more result rows 380. Each result row includes identification fields: a Listing ID 366 to identify the listing, a Query ID 367 to identify the query, a Keyword ID 368 to identify the keyword, an Advertiser ID 370 to identify the listing owner. Each Row also include fields used to conduct the EDA Center Business: the Position Rank 372 number is used to determine the order of the listings, the Business Rule ID 374 specifies the accounting and business process used to handle referrals. Finally each row also contains the actual listing which can be relayed to EDA Center customers: this includes the listing Message Content 376, and a Referral Phone Number 378. The Listing Database of the LMSvr FIG. 1-40 connects to the LDSvr FIG. 1-50.

In a preferred implementation, the handling and business process specified by the Business Rule ID determines how a referral is charged back. The disclosed implementation allows for one or a plurality of charge back schemes or business models.

In a preferred implementation, an individual charge back is predetermined by a contracted charge agreed on between the EDA Service provider and the listing advertiser.

In a preferred implementation, the charge back is dynamically controlled and related to a customer satisfaction or any number of external performance criteria.

Figure 7:
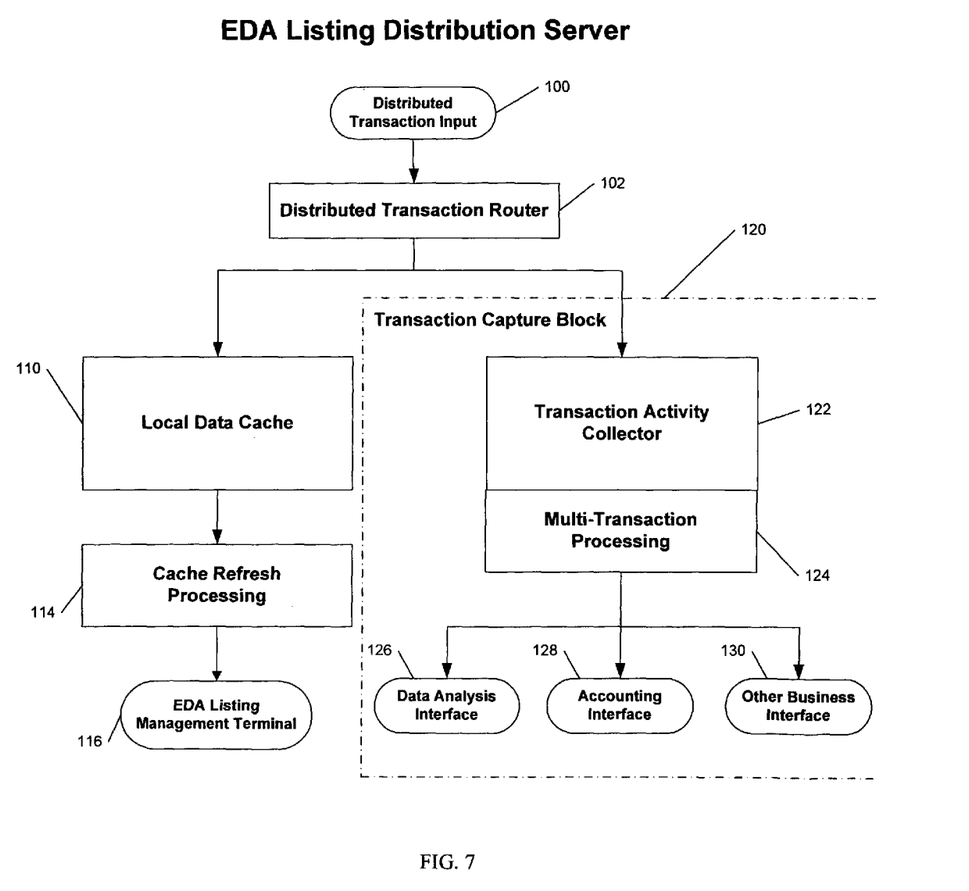
FIG. 7 is a system block diagram of an Enhanced Directory Assistance Listing Distribution Server.

In a preferred implementation, the Distributed Transaction Terminal FIG. 4-98 sends a transaction message to the Distributed Transaction input FIG. 7-100 of the LDSvr.

FIG. 7 shows an overview of a preferred Enhanced Directory Assistance Listing Distribution Server implementation.

Transaction Activity Capture

The LDSvr collects or captures referral calls as detailed in the Accept Referral process of FIG. 2-318.

In a preferred implementation, a referral is generated by the EDA operator clicking on an HTML hyperlink that appears on the Display Screen FIG. 3-72 of the EDA Operator Position Station. The hyperlink contains HTML attribute-value pairs in the well-known HTML destination URL format. The attribute-value pairs represent fields from a row of the Return Results FIG. 6-364 table and include the Listing ID FIG. 6-366, the Query ID FIG. 6-367, the Keyword ID FIG. 6-368, the Advertiser ID, FIG. 6-370 and the BusRule ID FIG. 6-374.

In a preferred implementation, selecting a menu option in an Interactive Voice Response (IVR) dialog generates a referral. The IVR dialog is generated using standard and well-known VXML programming. The dialog menu options are dynamically constructed fields of a row from the Return Results FIG. 6-364 table and include the Listing ID FIG. 6-366, the Query ID FIG. 6-367, the Keyword ID FIG. 6-368, the Advertiser ID, FIG. 6-370 and the BusRule ID FIG. 6-374.

In a preferred implementation, a referral is a URL address with attribute-value parameters that completely identify the referral listing. The said referral is in the form of an XML message and represents a unique transaction involving a telephone caller, a listing advertiser and the EDA Service.

Referring to FIG. 7, the type of transaction message is identified by the Distributed Transaction Router (DTR). The DTR recognizes a plurality of transaction message types including Cache Refresh messages and Activity Capture messages. Cache Refresh messages are routed to the Local Data Cache 110 (LDC) and Activity Capture messages are routed to the Transaction Capture Block 120.

Local Data Cache

Referring to FIG. 7, the LDC operates in the manner of well-known distributed Internet caches that store pre-aggregated query results. The query results are organized by keyword and localization code. The data contained in the LDC is tagged with an expiration date timestamp. When the expiration timestamp is passed, the cache data is expired.

Upon expiration of data in the LDC, a refresh message is generated and sent to a Cache Refresh Processing 114 component (CRP). The refresh message is routed to the EDA Listing Management Input shown in FIG. 4-80. The message contains a Keyword Lookup Query that is processed as previously described.

In a preferred implementation, the LDC is a plurality of data cache servers organized as a distributed computing web farm.

Transaction Capture Block

Referring to FIG. 7, the Transaction Capture Block 120 includes the Transaction Activity Collector 122 component and the Multi-Transaction Processing 124 component. The Transfer Capture Block receives Activity Capture type transaction messages from the DTR. The message identifies the referral of an EDA listing to an EDA caller.

Figure 8:
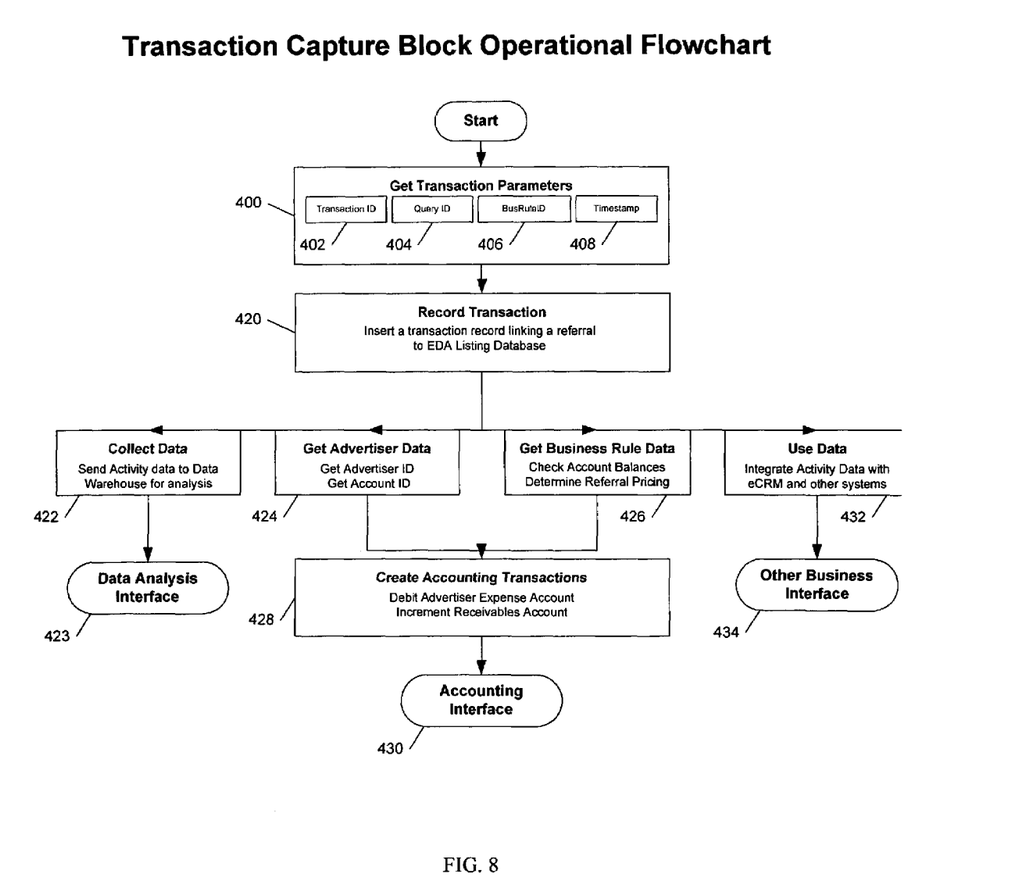
FIG. 8 is a flow chart of the Transaction Capture Block operation.

The operation of the Transaction Capture Block is unique to the Enhanced Directory Assistance Service implementation and is detailed in FIG. 8.

Referring to FIG. 8, the Transaction Capture operation starts with the Get Transaction Parameters 400 process. In a preferred implementation, a minimal set of parameters is used to uniquely identify the query and the advertiser the query belongs to. A minimal set of parameters includes a Transaction ID 402 that uniquely identifies the referral, a Query ID 404 that uniquely identifies the contents of the referral, a BusRule ID 406 that specifies the business process that governs the referral and a Timestamp 408.

Once the data is assembled, a transaction record uniquely identifying the referral is inserted into a Listing database transaction table in the Record Transaction 420 process. The data from this record is then processed. This processing is the primary focus of the Transaction Capture operation.

The Get Advertiser Data 424 and the Get Business Rule Data 426 processes set up transactions for the EDA Center accounting system. The Get Advertiser Data operation gets the Advertiser ID and Account Number of the referred directory listing. The Get Business Rule Data operation identifies and sets up the business process and pricing rules that govern this particular transaction.

Once the referral parties and the referral business rules are identified, accounting transactions are created and posted to the EDA Center accounting system via the Accounting Interface 430.

The operation of this type account system is well known and well understood. The generation of multiple and distinct business transactions for a single telephone referral is one of the unique processes of this disclosure.

Other Data

The Collect Data 422 process aggregates any necessary data for conducting marketing and sales analysis. This data is then sent to the analysis systems via a Data Analysis Interface 423. Similarly, the Use Data 432 process aggregates and collects data for use by other systems that are well known in the art such as Customer Relations Management systems. This data is sent via the Other Business Interface 434.

Although exemplary embodiments of the present invention have been shown and described, it will be apparent to those having ordinary skill in the art that a number of changes, modifications, or alterations to the invention as described herein may be made, none of which depart from the spirit of the present invention. All such changes, modifications and alterations should therefore be seen as within the scope of the present invention.

It is claimed:

1. A method for maintaining a dynamically controlled index for a telephone directory assistance system comprising:
   receiving from an advertiser via a communication interface an advertiser-generated refresh request; and
   using a processor to update based on data comprising the advertiser-generated refresh request one or both of:
      a listing associated with the advertiser and
      one or more of a keyword index, a localization index, and a position control index;
   wherein the keyword index, the localization index, and the position control index are used to respond to telephone directory service requests, including by controlling what listings are selected for response, and the order in which they are returned for response, and
   wherein the advertiser-generated refresh request enables the advertiser to control dynamically whether a listing associated with the advertiser is included in telephone directory service requests, and in what position the associated listing is returned in the request.

2. A method as recited in claim 1, wherein the advertiser-generated refresh request comprises a local data refresh query to update local cached results for telephone directory service requests.

3. A method as recited in claim 2, wherein updating local cached results enables the advertiser to ensure that a listing associated with the advertiser is in a favorable order returned for response, by updating the local cache for telephone directory service requests to comprise recent changes.

4. A method as recited in claim 2, wherein updating local cached results enables the advertiser to ensure that a listing associated with the advertiser is included in what listings are selected for response, by updating the local cache for telephone directory service requests to comprise recent changes.

5. A method as recited in claim 2, wherein the local data refresh query comprises keywords and refresh cycle time parameters.

6. A method as recited in claim 1, wherein a keyword within the keyword index is provided by the advertiser.

7. A method as recited in claim 1, further comprising applying a filter to a listings database used to respond to telephone directory service requests, in part to reduce response time for telephone directory service requests.

8. A method as recited in claim 1, wherein the advertiser-generated refresh request comprises a position control refresh message.

9. A method as recited in claim 1, wherein the advertiser-generated refresh request comprises a position control refresh message, comprising a keyword parameter and instructions used to refresh one or more indexes.

10. A system for maintaining a dynamically controlled index for a telephone directory assistance system comprising:
    a processor configured to:
    receive from an advertiser via a communication interface an advertiser-generated refresh request; and
    update based on data comprising the advertiser-generated refresh request one or both of:
       a listing associated with the advertiser and
       one or more of a keyword index, a localization index, and a position control index;
    wherein the keyword index, the localization index, and the position control index are used to respond to telephone directory service requests, including by controlling what listings are selected for response, and the order in which they are returned for response, and
    wherein the advertiser-generated refresh request enables the advertiser to control dynamically whether a listing associated with the advertiser is included in telephone directory service requests, and in what position the associated listing is returned in the request;
    the communication interface coupled to the processor; and
    a memory coupled to the processor and configured to provide the processor with instructions.

11. A system as recited in claim 10, wherein the advertiser-generated refresh request comprises a local data refresh query to update local cached results for telephone directory service requests.

12. A system as recited in claim 11, wherein updating local cached results enables the advertiser to ensure that a listing associated with the advertiser is in a favorable order returned for response, by updating the local cache for telephone directory service requests to comprise recent changes.

13. A system as recited in claim 11, wherein updating local cached results enables the advertiser to ensure that a listing associated with the advertiser is included in what listings are selected for response, by updating the local cache for telephone directory service requests to comprise recent changes.

14. A system as recited in claim 11, wherein the local data refresh query comprises keywords and refresh cycle time parameters.

15. A system as recited in claim 10, wherein a keyword within the keyword index is provided by the advertiser.

16. A system as recited in claim 10, further comprising applying a filter to a listings database used to respond to telephone directory service requests, in part to reduce response time for telephone directory service requests.

17. A system as recited in claim 10, wherein the advertiser-generated refresh request comprises a position control refresh message.

* * * * *

UNITED STATES PATENT AND TRADEMARK OFFICE
CERTIFICATE OF CORRECTION

PATENT NO.       : 7,596,218 B2                                                      Page 1 of 1
APPLICATION NO.  : 10/448808
DATED            : September 29, 2009
INVENTOR(S)      : Montemer It is certified that error appears in the above-identified patent and that said Letters Patent is hereby corrected as shown below:

Column 3, line 11 delete "results to the" and insert -- results to a --
Column 3, line 25 delete "customer 500 connects" and insert -- customer 570 connects --
Column 3, line 26 delete "510" and insert -- 572 --
Column 3, line 27 delete "520" and insert -- 574 --
Column 3, line 30 delete "526" and insert -- 580 --
Column 3, line 31 delete "527" and insert -- 582 --
Column 3, line 32 delete "528" and insert -- 584 --
Column 3, line 33 delete "530" and insert -- 586 --
Column 5, line 15 delete "played pack" and insert -- played back --
Column 5, line 40 delete "engine." and insert -- engine, including Business Category Control Structure 220 (also shown as 94 in Figure 4) comprising Business Category A 224, Business Category B 226, Business Category C 228 and more categories 230. --
Column 7, line 55 delete "Display Screen" and insert -- Data Display --
Column 8, line 9 delete "(DTR)" and insert -- (DTR) 102 --
Column 8, line 25 delete "(CRP)." and insert -- (CRP), including EDA Listing Management Terminal 116. --
Column 8, line 36 delete "and the Multi-Transaction Processing 124 component." and insert -- and the Multi-Transaction Processing 124 component, including Data Analysis Interface 126, Accounting Interface 128 and Other Business Interface 130 --
Column 9, line 38 delete "whether a listing" and insert -- whether the listing --
Column 10, line 26 delete "whether a listing" and insert -- whether the listing --

Signed and Sealed this

Ninth Day of February, 2010

David J. Kappos
*Director of the United States Patent and Trademark Office*